United States Patent
Wang et al.

(10) Patent No.: US 6,423,657 B1
(45) Date of Patent: *Jul. 23, 2002

(54) PROCESS FOR THE REACTIVATION OF ACTIVATED CARBON

(75) Inventors: Chang Keun Wang, Daejon-Shi; Sang Eun Lee, Seoul; Hyun Je Oh, Seoul; Ju Youn Lee, Seoul; Kwang Nyoung Kim; Hyeon Yeoul Kim, both of Kyounggi-Do; Ki Seop Song, Seoul; Eung Taek Lee, Seoul; Hyoung Soo Hu, Seoul; Young Ho Lee, Kyounggi-Do; Sung Min Oh, Seoul, all of (KR)

(73) Assignees: Korea Institute of Construction Technology; Daewoo Engineering & Construction Ltd.; LG Construction Co., Ltd.; Samsung Corporation, all of Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,082

(22) Filed: Dec. 4, 1997

(30) Foreign Application Priority Data

Jun. 21, 1997 (KR) .............................. 97-26359

(51) Int. Cl.$^7$ .............................. B01J 20/34; B01J 38/64; B01J 38/04
(52) U.S. Cl. .......................................... 502/25; 502/33
(58) Field of Search .............................. 502/25, 33, 56

(56) References Cited

U.S. PATENT DOCUMENTS 3,720,626 A * 3/1973 Benzaria et al. ............. 252/413
4,558,022 A * 12/1985 Farmerie et al. .............. 502/25

* cited by examiner

*Primary Examiner*—Alexander G. Ghyka
(74) *Attorney, Agent, or Firm*—Staas & Halsey LLP

(57) ABSTRACT

A process and a set of equipment for reactivating spent activated carbon onto which pollutants were adsorbed. The present process comprises subjecting the activated carbon to be reactivated in a mixed solution consisting of ethanol, sodium hydroxide solution and water to effectuate the desorption of the pollutants adsorbed on the activated carbon. The equipment includes (A) a mixing tank for mixing given amounts of water, ethanol and sodium hydroxide solution which are supplied from the respective receptacles thereof; (B) a reactivation reactor for receiving the mixed solution from the mixing tank and subjecting the spent activated carbon filled therein to the mixed solution to effect the desorption of the pollutants adsorbed on the spent activated carbon, wherein the reactivation reactor includes a unit for regulating temperature of the mixed solution; and (C) a storage tank for receiving the reactivated carbon.

5 Claims, 4 Drawing Sheets

PROCESS FOR THE REACTIVATION OF ACTIVATED CARBON

BACKGROUND OF THE INVENTION

1. Field of the Invention

The present invention relates to a process and an equipment for the reactivation of spent activated carbon onto which pollutants were adsorbed.

2. Description of the Related Art

Activated carbon is widely used in the purification of contaminated water and air because of its excellent capabilities of adsorbing various inorganic or organic substances.

After being used, the activated carbon is generally reactivated. The reactivation processes allow the activated carbon to recover its adsorption capacities and thereby, the reactivated carbon is re-used in the adsorption process. However, the current reactivation methods generally demand very high costs and thus, limit adopting the activated carbon-utilizing purification process.

There are various conventional methods for the reactivation of the used carbon, for example, thermal reactivation, solvent extraction or wet oxidation, etc., depending on the nature of the pollutants adsorbed on the activated carbon.

As being the most available reactivation method, the thermal reactivation requires the reactivation furnace to be processed at high temperatures of 900° C. to 1000° C. similar to that used in the production of the activated carbon. Therefore, the construction and maintenance of the thermal reactor demands high costs.

The existing solvent extraction method is disadvantageous because the adsorption recovery efficiency of the reactivated carbon is low and there is a possibility that a portion of the harmful solvent used remains in the reactivated carbon.

The wet oxidation method is deficient in the degradation or desorption of the pollutants irreversibly adsorbed on the activated carbon.

Therefore, there has been a need for new methods and/or equipment permitting the reactivation of the spent activated carbon, which can highly recover the adsorption capacities of the activated carbon and which also are less costly to use and operate.

SUMMARY OF THE INVENTION

The present invention provides a method of the reactivation of spent activated carbon onto which pollutants were adsorbed, which comprises a first step of subjecting the used activated carbon to a mixed solution including ethanol, sodium hydroxide solution and water to effectuate the desorption of the pollutants adsorbed on the activated carbon.

In addition, the present invention provides equipment for reactivating the spent activated carbon onto which the pollutants were adsorbed, which comprises (A) a mixing tank for mixing given amounts of water, ethanol and sodium hydroxide solution which are supplied from respective receptacles thereof; (B) a reactivating reactor for receiving the mixed solution from the mixing tank and subjecting the spent activated carbon filled therein to the mixed solution to effectuate the desorption of the pollutants adsorbed on the spent activated carbon, wherein the reactivation reactor is provided with means for regulating temperature of the mixed solution; and (C) a storage tank for receiving the reactivated carbon.

DETAILED DESCRIPTION OF THE INVENTION

According to the present invention, ethanol is preferably used in the amount of 10% to 50% based on a mixed solution of ethanol, sodium hydroxide solution, and water, and the sodium hydroxide solution is used in the amount of 1% to 4% based on the mixed solution.

In a further preferred embodiment of the present invention, the mixed solution of ethanol, sodium hydroxide solution, and water is heated to a temperature in a range from ambient to 100°. In direct connection, since the desorption of the pollutants adsorbed on the activated carbon proceeds at a lowertemperature than in other methods, the present process and equipment advantageously require a lower expenditure of energy and more convenient operation and maintenance.

In a still further preferred embodiment, the desorption of the pollutants adsorbed on the activated carbon in the mixed solution of ethanol, sodium hydroxide solution and water proceeds for a period of 6 to 24 hours.

The reactivation process and the equipment of the present invention can be applied to drinking water and wastewater treatment plants, air pollution-preventing equipments, etc. It is especially useful in the purification of drinking water, since solvents used by the present invention, i.e., ethanol and sodium hydroxide are food grade and not harmful.

The reactivation process according to the present invention will be described in detail in reference to the accompanying drawings.

Figure 1:
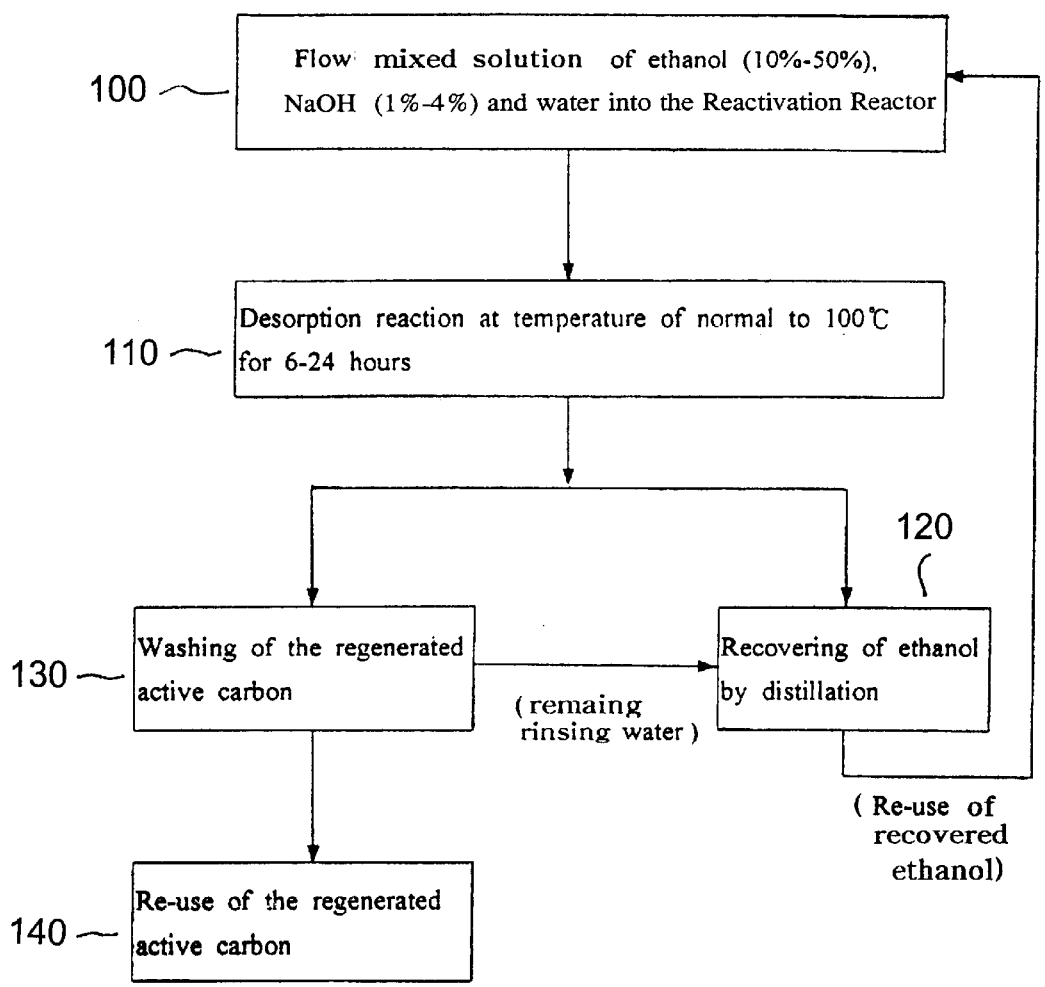
FIG. 1 is a flow chart illustrating a process for the reactivation of activated carbon according to the present invention.

FIG. 1 is a flow chart illustrating the physico-chemical process according to the present invention for the reactivation of spent activated carbon onto which pollutants were adsorbed. As shown, 1% to 4% of NaOH, 10% to 50% of ethanol and water are mixed in a mixing tank and the mixed solution in the mixing tank is circulated into a reactivation (step 100) reactor filled with the spent activated carbon to be reactivated. The reactivation tank is tightly closed and heated to a temperature in the range between normal temperature and 100° C. for 6 to 24 hours (step 110). As a result, the pollutants are desorbed from the activated carbon. The waste liquid formed by such a desorption reaction in the reactivation reactor is transported via a receptacle into a distiller. Ethanol is recovered from the waste liquid in the distiller by evaporation, followed by condensation (step 120). The recovered ethanol is circulated into the mixing tank and recycled for the next reactivation process. Meanwhile, after the waste liquid formed by the desorption reaction in the reactivation reactor exits to the receptacle, the activated carbon in the reactivation reactor is in situ washed (rinsed) with tap water in order to remove the residual ethanol and NaOH from the activated carbon (step 130). Additionally, ethanol in the washing water is also recovered for re-use. As a final procedure, the reactivated carbon is transported to a storage tank or an adsorber for re-use (step 140).

Figure 2:
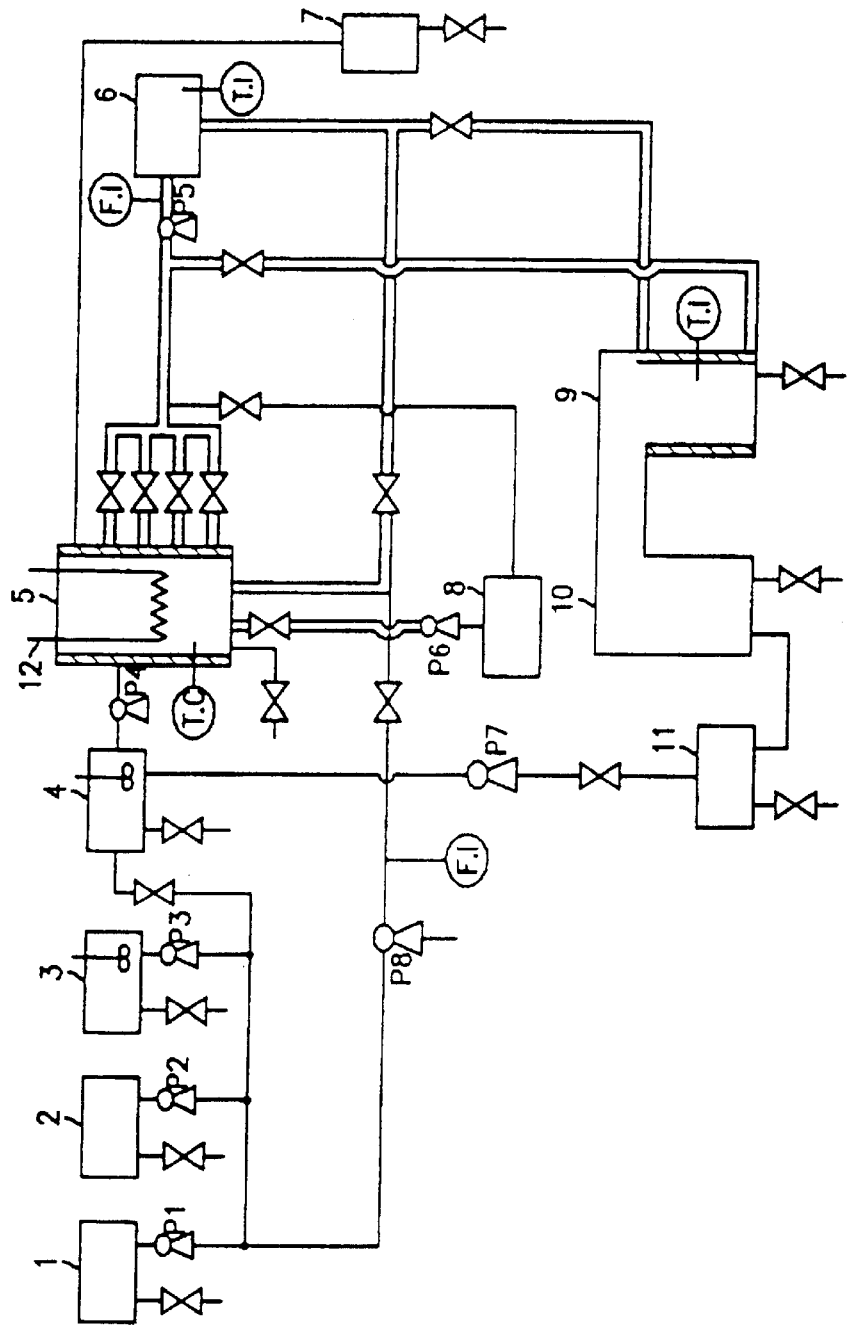
FIG. 2 shows equipment for the reactivation of activated carbon according to the present invention.

FIG. 2 shows equipment for the reactivation of the activated carbon according to the present invention. This figure illustrates three receptacles 1, 2 and 3 for containing water, ethanol and NaOH solution, respectively. The respective solvents are circulated by pumps P1, P2 and P3 into a mixing tank 4. After the solvents are mixed in the mixing tank 4, the mixed solution is circulated by a pump P4 into a reactivation reactor 5 filled with the spent activated carbon onto which pollutants were adsorbed. The temperature in the reactivation reactor 5 is increased by the heat supplied from a boiler 6 and/or a heater 12, the heater 12 being equipped within the reactivation reactor 5. After the completion of the desorption, the resulting waste liquid in the reactivation reactor 5 is circulated by a pump P6 into a receptacle 8 and then, the activated carbon in the reactivation reactor 5 is washed with tap water while the washing water flows via valves to a distiller 9. The washed activated carbon in the reactivation reactor 5 is carried to a storage tank 7. The waste liquid in the distiller 9 is heated by the boiler 6 to evaporate the ethanol. The evaporated ethanol is condensed and collected. The ethanol in the storage tank 11 is circulated by a pump P7 into the mixing tank 4 for re-use.

The following examples are given merely as illustrations of the present invention and demonstration of the preferred embodiments of the present invention, and are not to be considered as limiting.

EXAMPLES

The activated carbon used for water treatment for 1 year and 4 months was subjected to the reactivation process of the present invention. 108 cases in the desorption process were established by varying the amount of ethanol between 10% and 50%, the amount of NaOH between 1% and 4% and the condition of ambient temperature to 100° C., and UV254 absorbance was measured on the waste liquid formed through the desorption process. The results are summarized as follows.

When the desorption was carried out at the ambient temperature, the UV absorbance of the extracted solution by the present invention is 8,000 to 30,000 times as high as that from tap water. For the desorption temperature of 60° C., the extracted solution by the present invention increases the UV254 absorbance by 15,000 to 50,000 times of the tap water treated. For the desorption temperature of 100° C., the extracted solution by the present invention increased the UV254 absorbance by 16,000 to 80,000 times of the tap water treated.

Particularly, when the desorption was performed for 12 to 24 hours at 80° C. to 100° C., the mixed solution consisting of 20–40% of ethanol, 2–4% of NaOH and water increased the UV254 absorbance by 50,000 times or more as compared to tap water.

It is expected that such unexpected results are derived from the synergistic effects occurring due to the combination of the selective solvents and temperature for the desorption according to the present invention.

Figure 3:
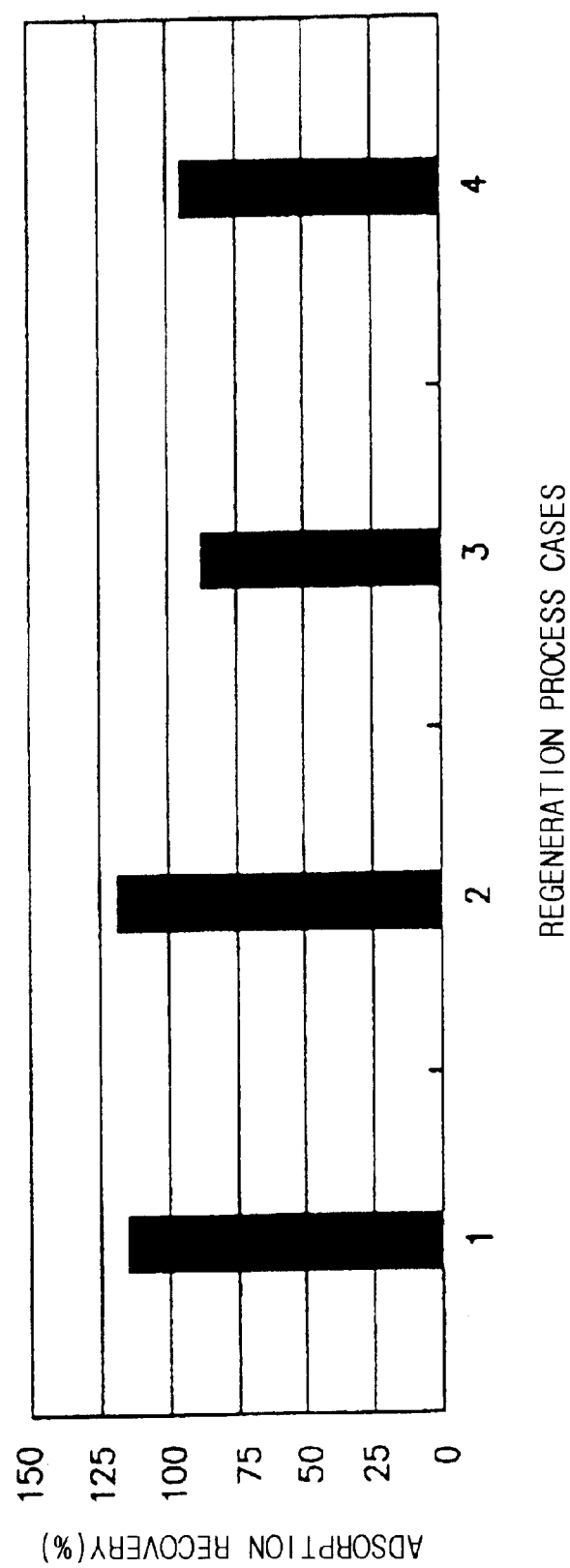
FIG. 3 shows a bar graph of phenol adsorption recovery of reactivated carbons under conditions 1 to 4 according to the present invention.
Figure 4:
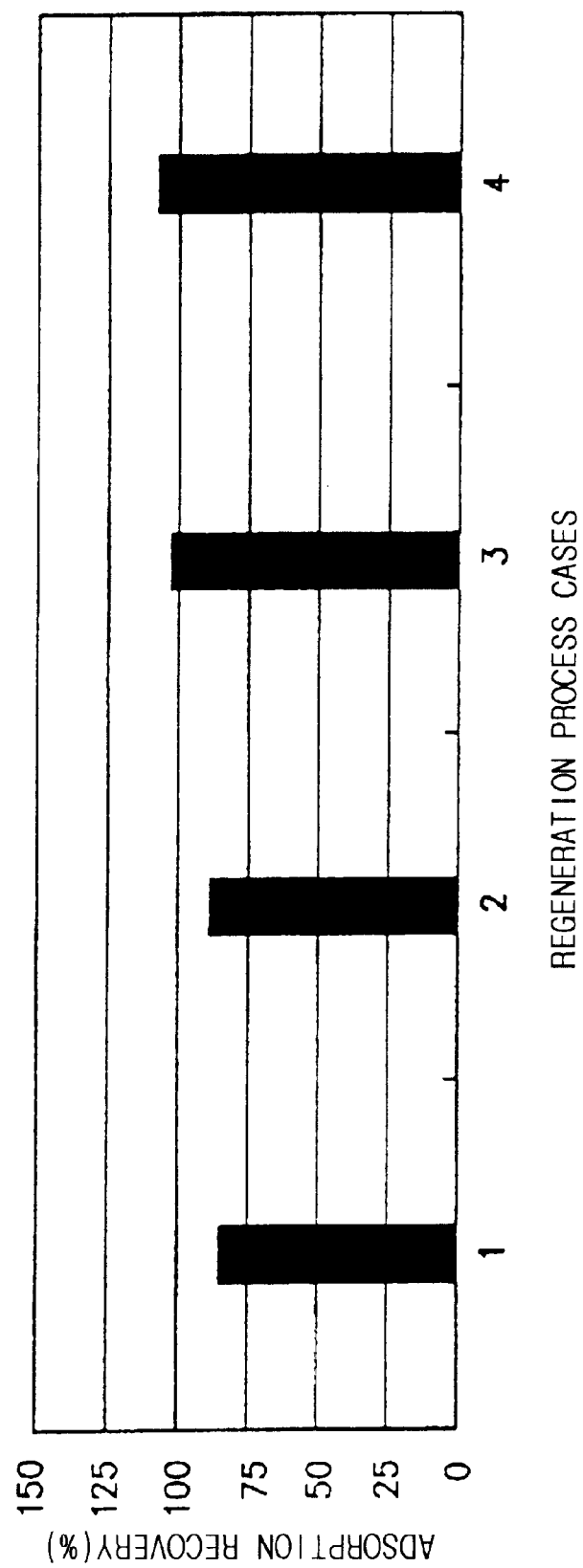
FIG. 4 shows a bar graphs of humic substances adsorption recovery of reactivated carbons under conditions 1 to 4 according to the present invention.

FIGS. 3 and 4 are bar graphs of the recovery of adsorption capacities of the activated carbon which was reactivated by the reactivation process of the present invention. The adsorption capacity recovery was evaluated by adsorbing phenol (FIG. 3) or humic substance (FIG. 4) on the reactivated carbon for 48 hours.

As shown in FIG. 3, typically, the recovery of phenol adsorption by the reactivated carbon according to the present invention ranges from 80% to 120%. Especially, when 20% of ethanol, 4.0% of NaOH and temperature of 100° C. are utilized for the desorption, the adsorption recovery amounts to approximately 120% as presented in bars 1 and 2. Bars 1 and 2 indicate the results obtained by using the reactivated carbon in the amounts of 0.5 g and 1.5 g, respectively. Bars 3 and 4 indicate the results obtained by utilizing 20% of ethanol, 4.0% of NaOH and temperature of 200° C. as the desorption conditions while using 0.3 g and 1.0 g of the reactivated carbon, respectively. As shown in FIG. 4, the humic substance adsorption recovery of the reactivated carbon according to the present invention is from 80% to 100%. Generally, the humic substance adsorption recovery is comparatively lower than the phenol adsorption recovery but it is still acceptable considering the lower cost. Bars 1 and 2 indicate the results obtained by utilizing 20% of ethanol, 4.0% of NaOH and temperature of 100° C. as the desorption conditions while using 0.5 g and 1.5 g of the reactivated carbon, respectively. Bars 3 and 4 indicate the results obtained by utilizing 20% of ethanol, 4.0% of NaOH and temperature of 200° C. as the desorption conditions while using 0.3 g and 1.0 g of the reactivated carbon, respectively.

The removal of the humic substance by the reactivated carbon was determined by a column test. The reactivated carbon was formed by subjecting the activated carbon used in a water treatment plant for 16 months in the equipment depicted in FIG. 2 for 12 hours while using the mixed solution of 20% of ethanol, 4% of NaOH and water and the temperature of 100° C. as the desorption conditions. The column test revealed that the humic substance removal efficiency of the reactivated carbon of the present invention corresponds to about 90% as compared to that obtained by fresh activated carbon. This result indicates that the reactivation process of the present invention is comparable to the prior thermal reactivation in terms of its humic substance removal.

Iodine adsorption was tested for the reactivated carbon of the present invention. This activated carbon has been used in a water treatment plant for 16 months in the equipment of the present invention for 24 hours while using the mixed solution of 20% of ethanol, 2% of NaOH and water and the temperature of 100° C. as the desorption conditions. This test revealed that the iodine number of the reactivated carbon ranges to 80%–90% of the fresh activated carbon. Table I below shows the iodine number of the reactivated and fresh carbon. The iodine number was evaluated by the Korean Granular Activated Carbon Test Method KSM 1802 which is the same as the AWWA procedure.

TABLE I

| Active Carbon Types | Iodine Adsorption (mg/g) |
| --- | --- |
| Regenerated by the present process | 1023 |
| Fresh | 1212 |
| Korean Standard Rating 1 | 1,100 or more |
| Korean Standard Rating 2 | 1,000 to 1,100 |
| Korean Standard Rating 3 | 900 to 1,000 |

As can be shown in Table I, the reactivated carbon of the present invention recovered the iodine number significantly, and therefore, it is concluded that the process for the reactivation of the spent activated carbon according to the present invention can be successfully applied to the water and air purification industries.

What is claimed is:

1. A method of regenerating a spent activated carbon on which pollutants were adsorbed, consisting essentially of:

(a) subjecting the spent activated carbon to a mixed solution of ethanol, sodium hydroxide solution and water to effectuate a desorption of the pollutants adsorbed on the activated carbon to generate reactivated carbon, wherein the spent activated carbon is filled in a reactivating reactor containing the mixed solution to thereby substantially allow the mixed solution to simultaneously and cooperatively act on the spent activated carbon; and (b) rinsing the reactivated carbon to thereby generate the regenerated activated carbon.

2. The method according to claim 1, wherein the step (b) comprises rinsing the reactivated carbon with rinsing water in the reactivation reactor under normal atmosphere to remove the residual ethanol and sodium hydroxide from the activated carbon.

3. The method according to claim 2, wherein the step (b) comprises recovering the ethanol in waste liquid remaining from the step (a) and remaining rinsing water formed from the step of rinsing the reactivated carbon.

4. The method according to claim 2, wherein the mixed solution includes 10% to 50% of ethanol and 1% to 4% of sodium hydroxide solution and water occupying a remaining percentage.

5. The method according to claim 4, wherein the temperature of the mixed solution is ambient to 100° C.

* * * * *